United States Patent
Campbell

(10) Patent No.: US 10,751,935 B2
(45) Date of Patent: Aug. 25, 2020

(54) SUBSTRATE BLANK SHEARING AND PRECISE STACK LOCATION APPARATUS AND METHOD FOR WEB FED PRESSES

(71) Applicant: Xerox Corporation, Norwalk, CT (US)

(72) Inventor: Richard Campbell, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 82 days.

(21) Appl. No.: 15/995,900

(22) Filed: Jun. 1, 2018

(65) Prior Publication Data
US 2019/0366625 A1    Dec. 5, 2019

(51) Int. Cl.
*B29C 64/147* (2017.01)
*B65H 35/00* (2006.01)
*B65H 37/00* (2006.01)
*B41J 11/00* (2006.01)
*B41J 11/70* (2006.01)
(Continued)

(52) U.S. Cl.
CPC .......... *B29C 64/147* (2017.08); *B29C 64/314* (2017.08); *B41J 11/0015* (2013.01); *B41J 11/70* (2013.01); *B41J 13/106* (2013.01); *B65H 35/0086* (2013.01); *B65H 37/002* (2013.01); *B29C 2793/0009* (2013.01); *B29C 2793/0045* (2013.01); *B29C 2793/0081* (2013.01); *B29C 2795/002* (2013.01)

(58) Field of Classification Search
CPC ................ B29C 64/147; B29C 64/314; B29C 2793/0009; B29C 2793/0081; B29C 2795/002; B29C 2793/0045; B65H 37/002; B65H 35/0086; B41J 13/106; B41J 11/0015; B41J 11/70
See application file for complete search history.

(56) References Cited

U.S. PATENT DOCUMENTS 3,599,522 A * 8/1971 Traphagen ............. B21D 37/10
83/219
4,245,538 A * 1/1981 Kammann ................ B26F 1/42
83/284
(Continued)

FOREIGN PATENT DOCUMENTS

JP    2010228021 A  * 10/2010

OTHER PUBLICATIONS

JP-2010228021-A published Oct. 14, 2010—Machine Translation of Description.*

Primary Examiner — Christopher T Schatz
Assistant Examiner — Cynthia L Schaller
(74) Attorney, Agent, or Firm — Caesar Rivise, PC

(57) ABSTRACT

The automation of the assembly of a stack of substrates in the process of forming an object includes a blanking die having a push through plate to drive the blanked sheets onto a set of locating pins, thereby creating a very accurate stack. An image forming device may print and develop images onto a web that is subsequently die cut and stacked onto a curing platen. The die cutter cuts individual sheets out of the web and cuts or pre-cuts alignment holes into each sheet that would be accepted by the curing platen having locating pins corresponding to the alignment holes in the sheet. The die cutting operation includes a tamping device that would accurately transfer the sheets from the die to the curing platen. This stack may then be removed and/or processed to form a 3D object.

20 Claims, 9 Drawing Sheets

(51) Int. Cl.
*B29C 64/314* (2017.01)
*B41J 13/10* (2006.01)

(56) References Cited

U.S. PATENT DOCUMENTS

| | | | |
|---|---|---|---|
| 4,680,023 A * | 7/1987 | Varano | B31B 50/00 |
| | | | 271/3.01 |
| 9,908,292 B2 | 3/2018 | Moore et al. | |
| 2005/0161146 A1 | 7/2005 | Graf | |
| 2009/0258233 A1 | 10/2009 | Bolser et al. | |
| 2014/0291886 A1 | 10/2014 | Mark et al. | |
| 2017/0297303 A1* | 10/2017 | Swartz | B29C 64/153 |
| 2019/0134890 A1* | 5/2019 | Swartz | B29C 64/147 |

* cited by examiner

SUBSTRATE BLANK SHEARING AND PRECISE STACK LOCATION APPARATUS AND METHOD FOR WEB FED PRESSES

FIELD OF DISCLOSURE

This disclosure relates generally to print substrate stacking systems, and more particularly, to implementing a comparatively higher speed process for blanking web fed material into sheared and stacked individual substrates in the process of building up substrate layers configured to form and/or manufacture three-dimensional objects, parts and components (3D objects).

BACKGROUND

In recent years, traditional object, part and component manufacturing processes, which generally included varying forms of molding or machining of output products, have expanded to include a new class of techniques globally referred to as "additive manufacturing" or AM techniques. These techniques, as currently implemented, generally involve processes in which layers of additive material, sometimes toxic or otherwise hazardous in an unfinished state, are sequentially deposited on the in-process 3D object according to a particular material deposition and curing scheme. As each layer is added in the 3D object forming process, the new layer of deposited marking material is added and adhered to the one or more already existing layers. Each AM layer may then be individually cured, at least partially, prior to deposition of any next AM layer in the 3D object build process.

AM manufacturing techniques include, but are not limited to, those techniques that have come to be referred to broadly as "3D printing" techniques usable for producing 3D printed objects. 3D printing techniques employ one or more processes that are adapted from, and appear in many respects to be similar to, well-known processes for forming two-dimensional (2D) printed images on image receiving media substrates. Significant differences in the output structures produced by the 3D printing techniques are generally based on (1) a composition of the deposited materials that are used to form the output 3D printed objects from the 3D printer; and/or (2) a number of passes made by the "print" heads in depositing comparatively large numbers of successive (and very thin) layers of the deposition material to build up the layers to the form of the output 3D printed objects.

A current AM process includes printing and developing slices of an object onto individual substrates, manually stacking these substrates, and then bonding the layers together using heat and pressure to form a solid object. Stacking the substrates is currently a manual procedure since a conventional blank die punching onto a solid baseplate needs to have the desired part pulled away, often to the side where they can be manually stacked. If the desired part is not pulled away, the cut sections randomly fall through to a catch basin while trimmings are pulled through the die. It would be beneficial to speed up this process.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing a blanking die apparatus for stacking substrate sheets from a printed substrate web of a printing process, with the blanking die apparatus including a punch holder, a die holder, at least one guide post, a punch plate and a knockout plate. The punch holder is aligned with the die holder and configured to reciprocate towards and away from the die holder in a direction transverse to a delivery path for the printed substrate web fed between the punch holder and the die holder. The punch holder has a cavity therein with a cavity opening adjacent the die holder. The die holder has a channel there through corresponding with the cavity of the punch holder. The punch holder and the die holder are configured to receive the printed substrate web there between, with the printed substrate web including a printed image portion and a non-printed boarder portion. The at least one guide posts is configured to maintain operative alignment of the punch holder and the die holder. The punch plate is slidingly received within the cavity in a peripherally spaced relation and is configured to reciprocate in the direction transverse to the delivery path of the printed substrate web between a recessed position in the punch holder and a cutting position extended into the channel of the die holder to sever a substrate sheet from the printed substrate web. The punch plate has an inner periphery wall defining an aperture. The knockout plate is slidingly received within the aperture of the punch plate in a peripherally spaced relation, and is configured to reciprocate in the direction transverse to the delivery path of the printed substrate web between a recessed location in the punch plate and a push through position beyond the die holder to push the severed substrate sheet through the channel. The recessed location of the knockout plate coincides with the recessed position of the punch plate and the push through position of the knockout plate extends through the channel beyond the cutting position of the punch plate. The blanking die apparatus may also include a sheet receiving cart aligned under the channel, with the cart including a base, a decrementing pressure plate and a plurality of location pins attached to the base and extending through the decrementing pressure plate towards the cavity of the punch holder to maintain operative alignment of the decrementing pressure plate and the base.

According to aspects illustrated herein, an exemplary method of automatically stacking substrate sheets from a printed substrate web of a printing process may include steps of feeding the printed substrate web along a delivery path between a punch holder and a die holder of a blanking die apparatus, wherein the punch holder is aligned with the die holder, the printed substrate web included a printed image portion and a non-printed boarder portion, the blanking die apparatus having at least one guide posts configured to maintain operative alignment of the punch holder and the die holder, pressing the printed substrate web between the punch holder and the die holder to hold the printed substrate web therebetween, the punch holder configured to reciprocate towards and away from the die holder in a direction transverse to a delivery path for the printed substrate web fed between the punch holder and the die holder, the punch holder having a cavity therein with a cavity opening adjacent the die holder, the die holder having a channel there through corresponding with the cavity of the punch holder, severing a substrate sheet from the printed substrate web with a punch plate slidingly received within the cavity of the punch holder in a peripherally spaced relation, the punch plate configured to reciprocate in the direction transverse to the delivery path of the printed substrate web between a recessed position in the punch holder and a cutting position extended into the channel of the die holder to sever the substrate sheet from the printed substrate web, the punch plate having an inner periphery wall defining an aperture, and pushing the severed substrate sheet through the channel of the die holder with a knockout plate slidingly received within the aperture of the punch plate in a peripherally spaced relation, the knockout plate configured to reciprocate in the direction transverse to the delivery path of the printed substrate web between a recessed location in the punch plate and a push through position beyond the die holder to push the severed substrate sheet through the channel, wherein the recessed location of the knockout plate coincides with the recessed position of the punch holder and the push through position of the knockout plate extends through the channel beyond the cutting position of the punch plate. The method may also include pushing the severed substrate sheet onto a sheet receiving cart aligned under the channel, the cart including a base, a decrementing pressure plate and a plurality of location pins attached to the base and extending through the decrementing pressure plate towards the cavity of the punch holder to maintain operative alignment of the decrementing pressure plate and the base, wherein the severed substrate sheet includes alignment apertures corresponding with the location pins, and the knockout plate is further configured to push the severed substrate sheet onto the decrementing pressure plate with the location pins through the alignment apertures.

According to aspects described herein, an image forming device in communication with the substrate web to transfer an image of marking material to the substrate web moving in a printing process direction may include an image forming device in communication with the substrate web to transfer an image of marking material to the substrate web moving in a printing process direction, and a blanking die apparatus. The blanking die apparatus may include a punch holder, a die holder, at least one guide post, a punch plate and a knockout plate. The punch holder is aligned with the die holder and configured to reciprocate towards and away from the die holder in a direction transverse to a delivery path for the printed substrate web fed between the punch holder and the die holder. The punch holder has a cavity therein with a cavity opening adjacent the die holder. The die holder has a channel there through corresponding with the cavity of the punch holder. The punch holder and the die holder are configured to receive the printed substrate web there between, with the printed substrate web including a printed image portion and a non-printed boarder portion. The at least one guide posts is configured to maintain operative alignment of the punch holder and the die holder. The punch plate is slidingly received within the cavity in a peripherally spaced relation and is configured to reciprocate in the direction transverse to the delivery path of the printed substrate web between a recessed position in the punch holder and a cutting position extended into the channel of the die holder to sever a substrate sheet from the printed substrate web. The punch plate has an inner periphery wall defining an aperture. The knockout plate is slidingly received within the aperture of the punch plate in a peripherally spaced relation, and is configured to reciprocate in the direction transverse to the delivery path of the printed substrate web between a recessed location in the punch plate and a push through position beyond the die holder to push the severed substrate sheet through the channel. The recessed location of the knockout plate coincides with the recessed position of the punch plate and the push through position of the knockout plate extends through the channel beyond the cutting position of the punch plate. The blanking die apparatus may also include a sheet receiving cart aligned under the channel, with the cart including a base, a decrementing pressure plate and a plurality of location pins attached to the base and extending through the decrementing pressure plate towards the cavity of the punch holder to maintain operative alignment of the decrementing pressure plate and the base.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Figure 1:
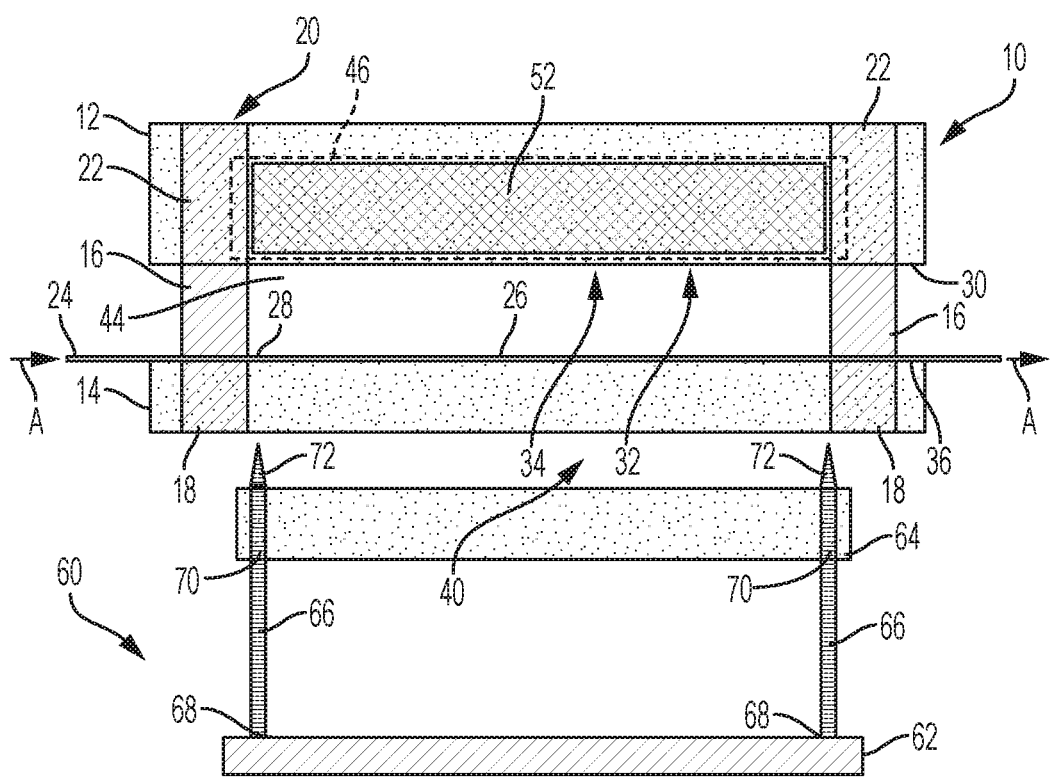
FIG. 1 is a side view, partially in cross, of a blanking die apparatus in accordance with an example of the embodiments.
Figure 2:
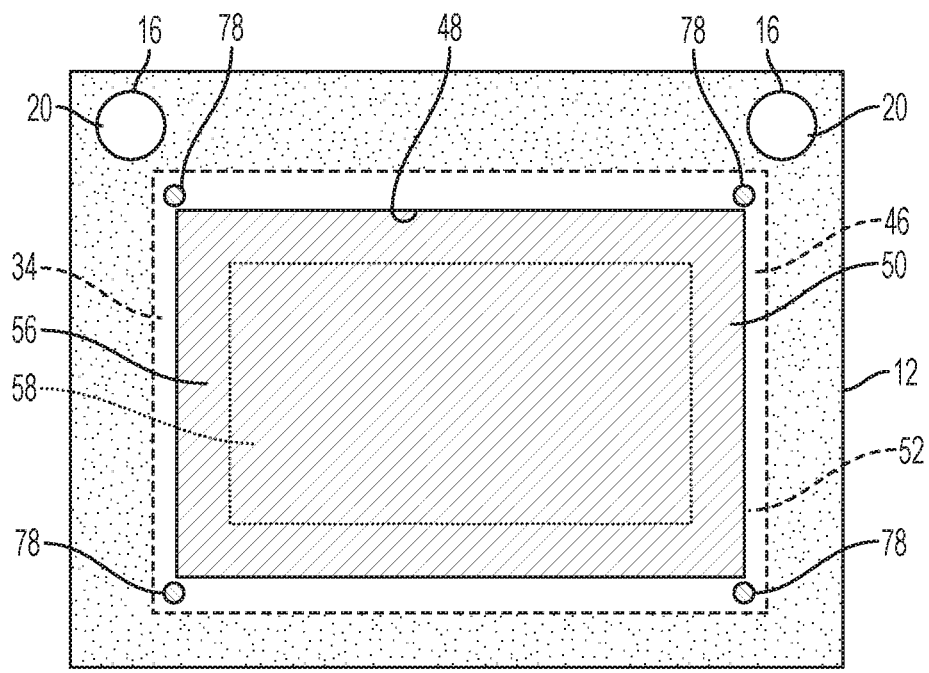
FIG. 2 is a top view, partially in cross, of the blanking die apparatus of FIG. 1.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for printing onto a substrate web and automatically stacking individual sheets of the web for AM manufacturing.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The terms "media", "web", "web substrate", "print substrate" and "substrate sheet" generally refers to a usually flexible physical sheet of paper, polymer, Mylar material, plastic, or other suitable physical print media substrate, sheets, webs, etc., for images, whether precut or web fed. The listed terms "media", "print media", "print substrate" and "print sheet" may also include woven fabrics, non-woven fabrics, metal films, carbon fiber reinforced material and foils, as readily understood by a skilled artisan.

The term "printing device" or "printing system" as used herein may refer to a digital copier or printer, scanner, image printing machine, xerographic device, electrostatographic device, digital production press, document processing system, image reproduction machine, bookmaking machine, facsimile machine, multi-function machine, 3D printer, or generally an apparatus useful in performing a print process or the like and can include several marking engines, feed mechanism, scanning assembly as well as other print media processing units, such as paper feeders, finishers, and the like. A "printing system" may handle sheets, webs, substrates, and the like. A printing system can place marks on any surface, and the like, and is any machine that reads marks on input sheets; or any combination of such machines.

The term "marking material" as used herein may refer to printing matter deposited by an image forming device onto a web substrate to form an image on the substrate. The listed term "marking material" may include inks, toners, metal particles, plastics, pigments, powders, molten materials, polyamide, nylon, glass filled polyamide, epoxy resins, bio-based resins, wax, graphite, graphene, carbon fiber, photopolymers, polycarbonate, polyethylene, Polylactic acid (PLA), Polyvinyl alcohol (PVA), ABS filament, high-density polyethylene (HDPE), high impact polystyrene (HIPS), Polyethylene terephthalate (PETT), ceramics, conductive filament and other ink jet materials.

The term 'image forming device", "printing device" or "printing system" as used herein refers to a digital copier or printer, scanner, image printing machine, xerographic device, digital production press, document processing system, image reproduction machine, bookmaking machine, facsimile machine, multi-function machine, or the like and can include several marking engines, feed mechanism, scanning assembly as well as other print media processing units, such as paper feeders, finishers, and the like. An image forming device can handle sheets, webs, marking materials, and the like. An image forming device can place marks on any surface, and the like and is any machine that reads marks on input sheets; or any combination of such machines.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The examples facilitate blanking web fed material into individual sheets and locating/stacking the sheets precisely for secondary processing after the printing/material deposition operations are complete. In examples, a compound blanking die includes a push through section of the punch to drive the sheets down locating pins and onto a sheet receiving cart for secondary processing. A conventional blank die punching onto a solid baseplate cart needs to have the desired part pulled away, often to the side, and manually stacked. The same with the trimmings. If the die is cleared, the cut sections randomly fall through to some catch basin while the trimmings are pulled through the die. In this proposal the trimmings are rolled through similar to what a non-punched web would be like. Although not shown in the accompanying sketches, the 4 pin stack may be assisted by a decrementing pressure pad to keep the cut blanks from shifting, tilting, snagging etc.

Figure 3:
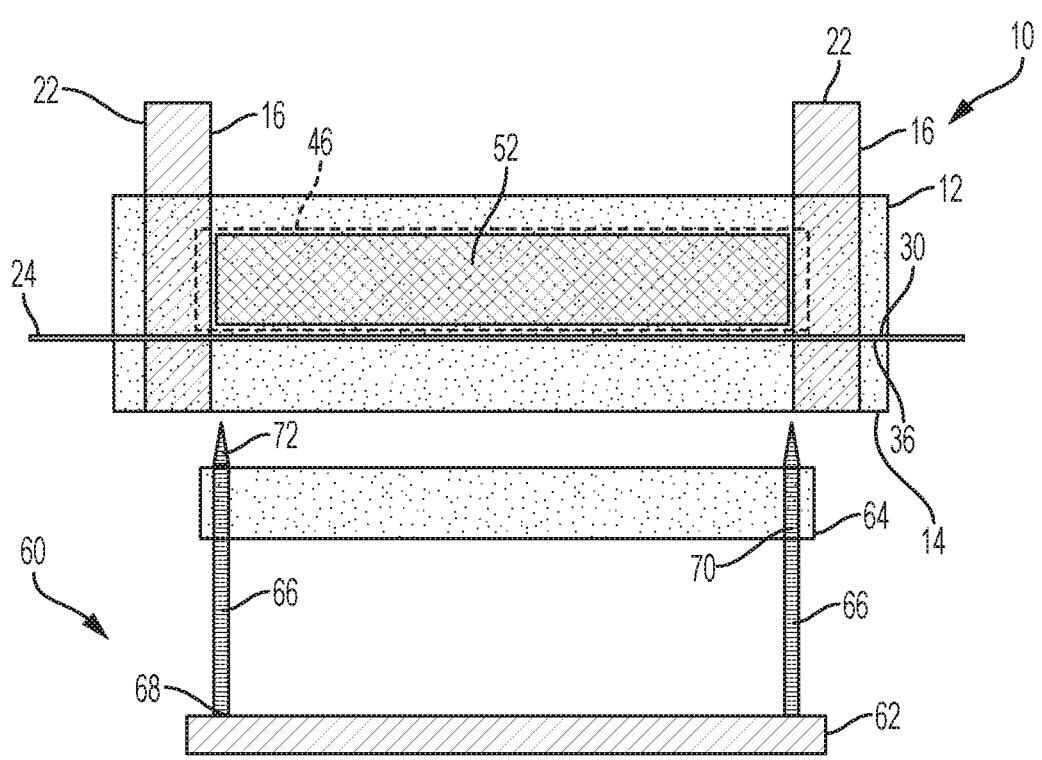
FIG. 3 is a side view, partially in cross, of the blanking die apparatus of FIG. 1 at a step in an exemplary operation of the blanking die apparatus.
Figure 4:
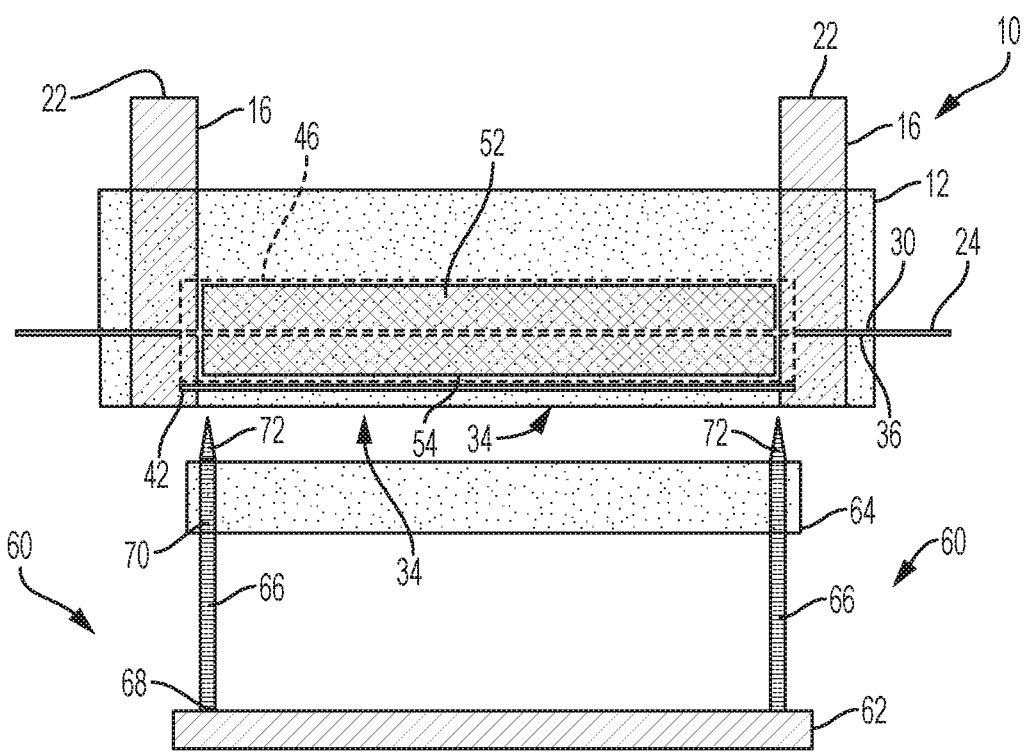
FIG. 4 is a side view, partially in cross, of the blanking die apparatus of FIG. 1 at another step in an exemplary operation of the blanking die apparatus.
Figure 5:
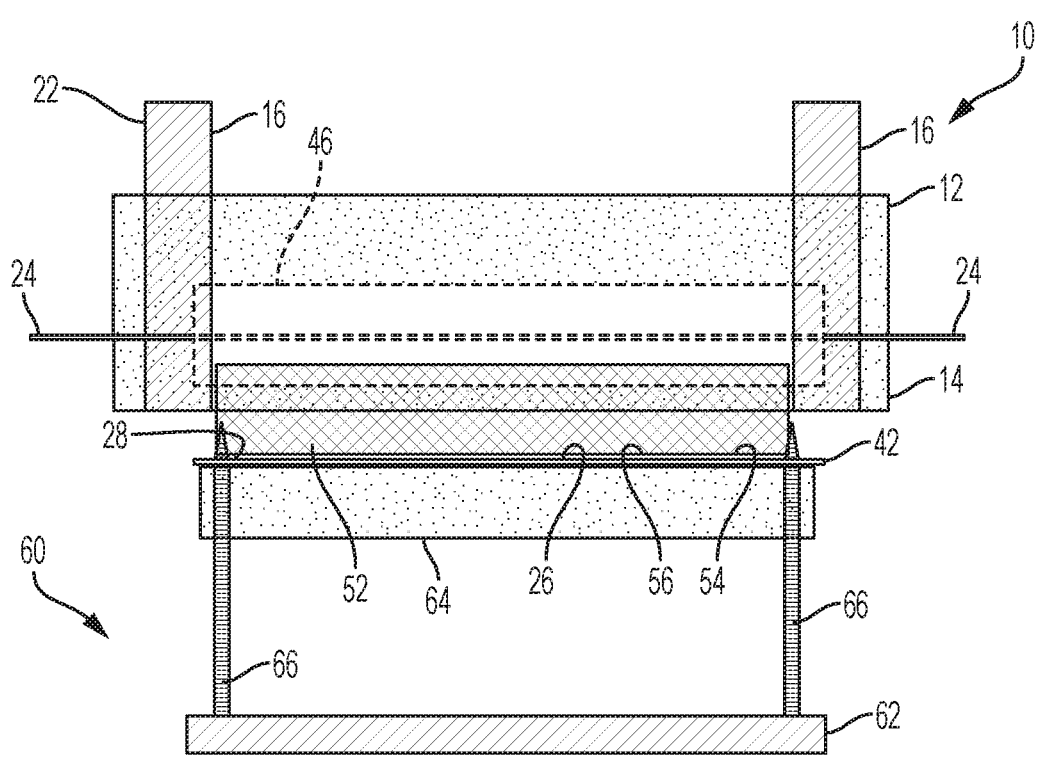
FIG. 5 is a side view, partially in cross, of the blanking die apparatus of FIG. 1 at yet another step in an exemplary operation of the blanking die apparatus.

FIG. 1 depicts a blanking die apparatus 10 for stacking substrate sheets from a printed substrate web of a printing process. FIGS. 2-5 show the blanking die apparatus 10 from a top view (FIG. 2) and side views during an exemplary operation of the apparatus (FIGS. 3-5). The blanking die apparatus 10 includes a punch holder 12, a die holder 14, and guide posts 16 configured to maintain operative alignment of the punch holder and die holder. The guide posts 16 may be fixed to corresponding apertures 18 of the die holder 14 and stand vertically thereon. The punch holder 12 may include channels 20 receiving top end portions 22 of the guide posts 16, with operative vertical alignment of the punch holder and die holder 14 maintained by fitting the guide posts into the channels. The punch holder 12 may be provided with guide bushings between the channels 20 and guide posts 16. While the exemplary blanking die apparatus 10 is shown with the guide post 16 fixed within the apertures 18 of the die holder 14 and slidably engaged within the channels 20 of the punch holder 12, it is understood that the examples are not limited to this configuration, as the guide post may be slidably engaged within at least one of the apertures 18 and channels 20 such that the punch holder is configured to reciprocate towards and away from the die holder in a direction (e.g., vertically) transverse to a delivery path (e.g., horizontal) that a printed substrate web 24 is fed between the punch holder and the die holder. As will be discussed in greater detail below, the printed substrate web 24 may include printed image portions 26 and non-printed boarder portions 28.

The punch holder 12 includes a downward facing peripheral stripper wall 30 defining a cavity opening 32 of a vertical cavity 34 centered within the punch holder. Facing the peripheral stripper wall 30, the die holder 14 includes an upward facing die plate 36 and an inner periphery wall 38 (not shown) defining a die channel 40 there through corresponding with the cavity 34 of the punch holder 12. While not being limited to a particular dimension, the die channel 40 may be sized at least the dimensions of a blanked sheet 42 (FIG. 4) of the printed substrate web 24 to allow passage of the web there through, as will be further described in greater detail below. When separated as shown in FIG. 1, the punch holder 12 and the die holder 14 define a gap 44 therebetween to receive the printed substrate web 24, which may be forwarded through the gap along a delivery path (e.g., horizontal) of the printed substrate web indicated by directional arrow A by a printer or other image forming device. The printed substrate web 24 may also be pulled along the delivery path through the gap 44 as well understood by a skilled artisan, where portions of the printed substrate web not blanked may be rolled or otherwise collected.

A punch plate 46 may slide within the punch holder 12 upon insertion of the punch plate in the cavity 34 of the punch holder 12. As can be seen in FIGS. 1,5, the punch plate 46 is shown slidingly located in a peripherally spaced relation within inner periphery walls of the punch holder that define the vertical cavity 34.

In this manner, the punch plate 46 is configured to reciprocate in a direction (e.g., vertical) transverse to the delivery path (e.g., horizontal) of the printed substrate web between a recessed position (FIG. 1) in the punch holder 12 and a cutting position (FIG. 4) extended into the die channel 40 of the die holder 14 to sever a blanked substrate sheet 42 from the printed substrate web 24. The punch plate 46 may be prevented from dropping down out of the punch holder 12 by cooperative engagement therebetween, for example, by engagement of a top collar (not shown) of the punch plate with an inward shoulder (not shown) of the punch holder extending into the cavity. The punch plate 46 may generally be shaped as a hollow cuboid having an inner periphery wall 48 (FIG. 2) defining an aperture 50.

A knockout plate 52 may be secured to the punch plate 46 by being inserted in the aperture 50 of the punch plate. As can be seen in FIGS. 1-5, the knockout plate 52 is slidingly received within the aperture 50 in a peripherally spaced relation with the punch plate 46. As such, the knockout plate 52 is configured to reciprocate in the direction transverse to the delivery path of the printed substrate web 24 between a recessed location (FIGS. 1, 3 and 4) in the punch plate 46 and an extended position (FIG. 5) where a bottom wall 54 of the knockout plate extends through the die channel 40 of the die holder 14 to push the blanked substrate sheet 42 through the channel. In examples, the knockout plate 52 may push the blanked substrate sheet 42 beyond the die holder 14. In its recessed location, the knockout plate 52 may coincide with the recessed position of the punch plate 46. In its extended position, the knockout plate 52 extends through the aperture 50 beyond the cutting position of the punch plate 46. The knockout plate 52 may be prevented from dropping down out of the punch plate 46 by cooperative engagement therebetween, for example, by engagement of a top collar (not shown) of the knockout plate with an inwardly extending shoulder (not shown) of the punch plate.

As noted above, the printed substrate web 24 may include printed image portion 26 and non-printed boarder portions 28 (FIG. 5). While not being limited to a particular arrangement, the non-printed boarder portions may represent the margins of individual blanked substrate sheets 42 around the printed image portion 26 of respective blanked sheets. It may be preferable to avoid unwanted touching of the printed image portions 26 before the deposited marking material dries as such touching may smear or otherwise degrade the image or purpose of the marking material. In examples, the substrate web may include a carbon fiber reinforced material, a plastic, a paper, a woven material, a non-woven material, mesh fiber sheet or other lightweight film material. When lightweight material is used for the substrate web, the punch plate 46 and knockout plate 52 may be made of a lightweight metal, plastic or other alloy material, which may minimize the weight of the blanking die apparatus 10 while increasing efficiencies by using lighter material.

The knockout plate 52 may generally be shaped as a cuboid having width and length dimensions less than the inner periphery wall 48 of the punch plate 46. The bottom wall 54 may include an exterior wall section 56 and an interior wall section 58 (FIG. 2) recessed from the exterior wall section. The exterior wall section 56 may be set to contact and push the non-printed boarder portion 28 of the blanked substrate sheets 42, with the interior wall section 58 recessed to avoid contact with printed image portions 26 of the blanked sheets. Thus the printed image portions 26 are not smeared or otherwise altered while the sheet is expelled from the die holder 14. The knockout plate 52 may also be shaped as a hollow cuboid, with the interior wall section removed so that the exterior wall section touches the non-printed boarder portions 28.

Still referring to FIGS. 1 and 3-5, the blanking die apparatus 10 may also include a sheet receiving cart 60 aligned under the die channel 40. The cart is designed to receive blanked substrate sheets 42 from the knockout plate 52 aligned with other blanked substrate sheets to form a stack of the sheets. The cart 60 may include a base 62, a pressure plate 64 and a plurality of location pins 66 attached to the base and extending through the pressure plate towards the cavity 34 of the punch holder 12 to maintain operative alignment of the decrementing pressure plate and the base. The location pins 66 may be fixed to corresponding apertures 68 of the cart base 62 and stand vertically thereon. The pressure plate 64 may include channels 70 receiving top end portions 72 of the location pins 66, with operative vertical alignment of the pressure plate and cart base 62 maintained by fitting the location pins through the channels. The pressure plate 64 may be provided with guide bushings between the channels 70 and location pins 66. While the exemplary cart 60 is shown with the location pins 66 fixed within the apertures 68 of the base 62 and slidably engaged within the channels 70 of the pressure plate 64, it is understood that the examples are not limited to this configuration, as the location pins may be slidably engaged within at least one of the apertures 68 and channels 70 such that the pressure plate is configured to reciprocate towards and away from the cart base in a direction (e.g., vertically) transverse to a delivery path (e.g., horizontal) that the printed substrate web 24 is fed between the punch holder 12 and the die holder 14.

Figure 6:
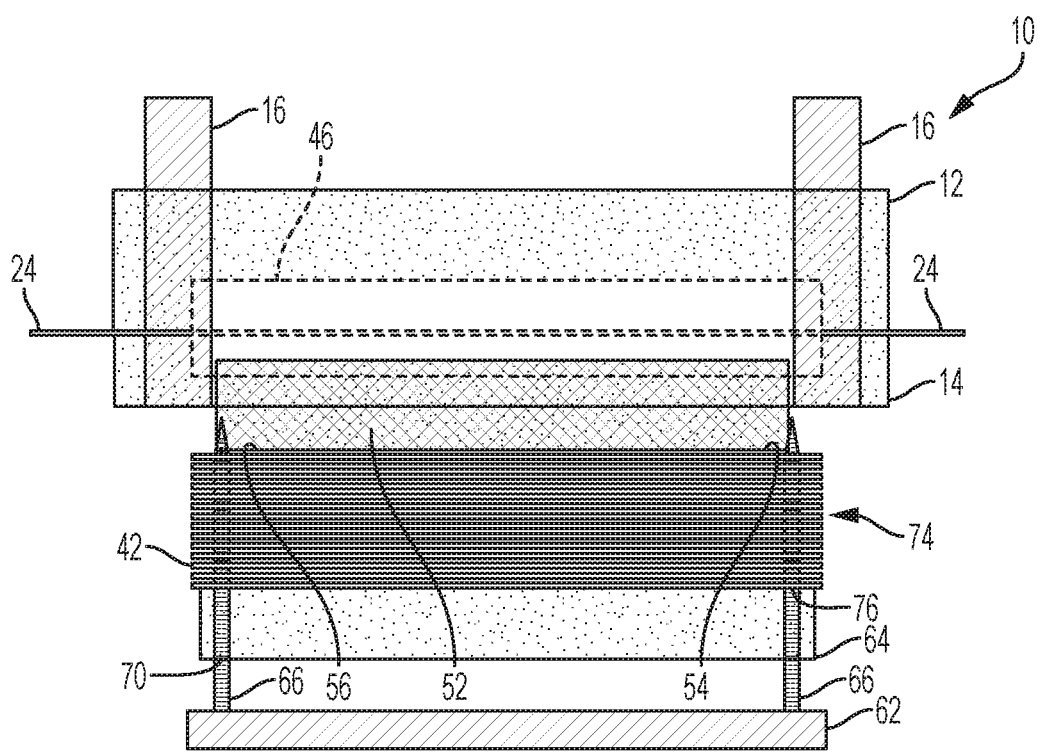
FIG. 6 is a side view, partially in cross, of the blanking die apparatus of FIG. 1 at still another step in an exemplary operation of the blanking die apparatus.

During operation of the blanking die apparatus 10, the punch plate 46 may repeatedly reciprocate between the recessed position and the cutting position to blank additional substrate sheets 42 from the printed substrate web 24 fed between the punch holder 12 and the die holder 14. As can be seen in FIG. 6, the knockout plate 52 is designed to push each additional blanked substrate sheet 42 through the aperture 50 onto the pressure plate 64, resulting in a stack 74 of aligned substrate sheets on the pressure plate. The pressure plate 64 may be a decrementing pressure plate designed to retract towards the base 62 as more blanked sheets 42 are fed onto the pressure plate enlarging the stack 74 of substrate sheets. In examples, the cart 60 may include compression springs and bushings between the base 62 and the pressure plate 64 as readily understood by a skilled artisan to bias the pressure plate to retract towards the base as more blanked sheets 42 are placed onto the pressure plate forming a stack 74 (FIG. 6), or 3D object, of the sheets. The stack 74 may be bonded to form an object, for example, by heat, pressure, and adhesion of the marking material to adjacent blanked sheets 42 for reinforcement. Such bonding may occur during a stacking, or subsequent to the stacking of blanked sheets 42, which may also be trimmed around the non-printed boarder portion 28, by for example, chemical wash, water wash, or vibratory trimming.

While not being limited to a particular theory, the pressure plate 64 retracts to a height above the base 62 where the top of the stack of blanked sheets 42 stays a consistent distance from the die holder 14. That is, during operation the decrementing pressure plate 64 may be maintained a predetermined distance from the die holder 14, for example, just below or about where the knockout plate 52 bottoms out at its extended position and pushes the blanked sheet 42 onto the pressure plate 64 or onto another blanked sheet stacked on the pressure plate. In this manner, the knockout plate 52 does not need to extend further and further to place a blanked sheet onto the pressure plate. In other words, the depth of stroke of the knockout plate 52 to its extension adjacent the top of a stack of blanked sheets 42 may remain consistent for the knockout plate to accurately place sheets onto the pressure plate 64 without having the sheets drift downwards to the pressure plate, which may introduce undesired sheet misalignment when forming stacks of the sheets. Thus, the knockout plate 52 is configured to push each blanked substrate sheet 42 the same distance through the die channel 40 onto the pressure plate 64, with the pressure plate being biased from the base 62 to decrement in distance from the base upon entry of each additional blanked substrate sheet onto the pressure plate. The knockout plate 52 is designed to push each blanked substrate sheet 42 to the pressure plate 64 or to the top sheet 42 on the pressure plate to avoid sheets floating down out of tight alignment.

The blanked substrate sheets 42 may include alignment apertures 76 sized and distance to correspond with the location pins 66 when the sheets are placed onto the decrementing pressure plate 64 via the knockout plate 52. The alignment apertures 76 may be pre-punched before the substrate sheets 42 are blanked, for example, via a rotary die or pierce tool (not shown) as well understood by a skilled artisan. The alignment apertures 76 may also be punched during the blanking operation of the substrate sheets 42 from the web 24 in a compound blanking of the alignment holes and substrate sheets, for example, with the punch plate 46 piercing alignment holes just prior to severing the substrate sheets 42 from the web. When the sheet receiving cart 60 is placed under the die holder 14 as shown in FIG. 5, the knockout plate 52 may push the blanked (severed) substrate sheets 42 onto the decrementing pressure plate 64 with the location pins 66 through the alignment apertures 76. The punch plate 46 and knockout plate 52 may also include vertically extending openings 78 (FIG. 2) aligned with the location pins 66 when the cart 60 is placed under the die holder 14 as may be needed to allow movement of the location pins through the punch plate and knockout plate.

Figure 7:
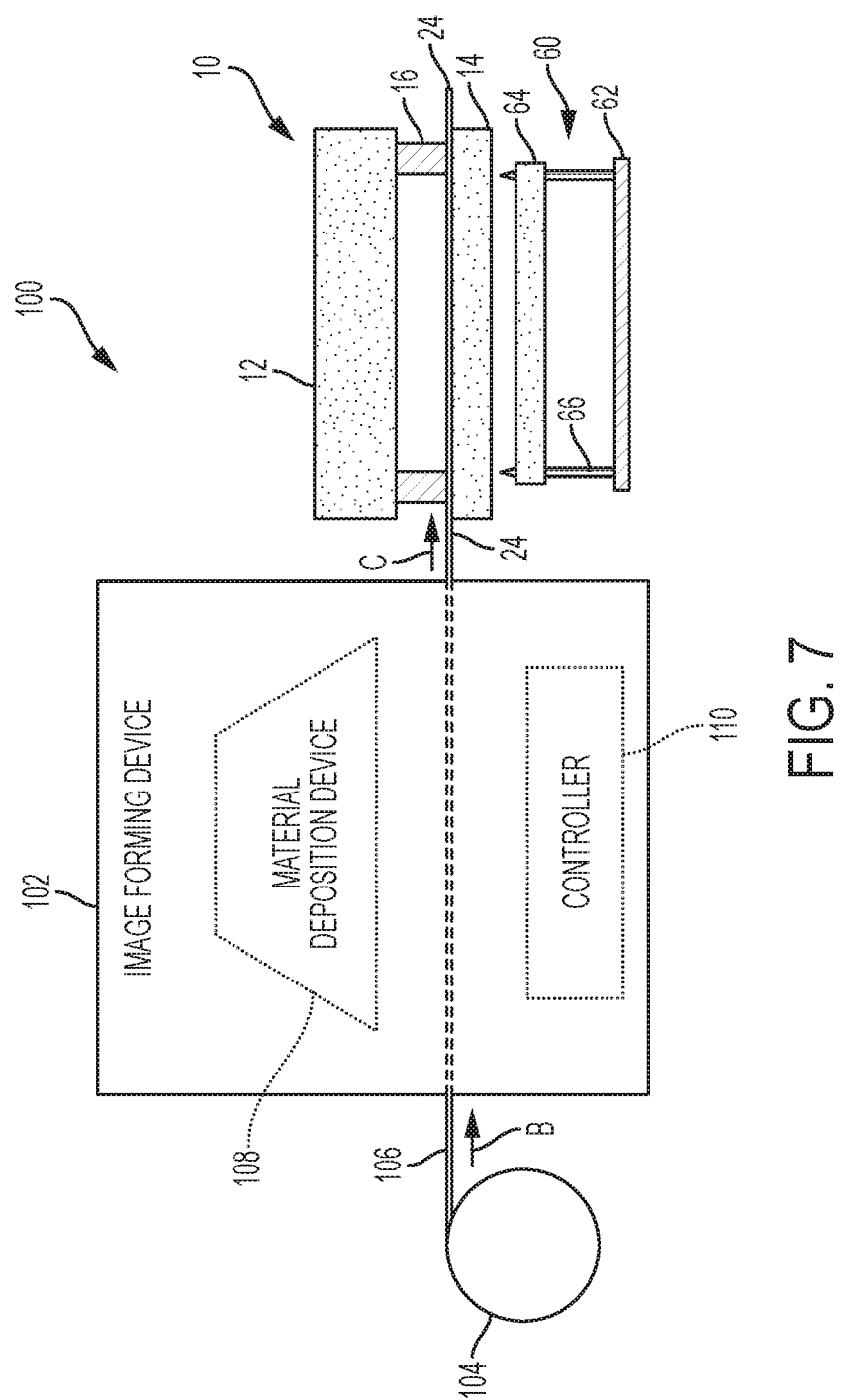
FIG. 7 is side view, partially in cross, of an image forming apparatus in accordance with an example of the embodiments.

FIG. 7 depicts an image forming apparatus 100 including an image forming device 102 and the blanking die apparatus 10 according to examples. As can be seen in FIG. 7, the exemplary image forming apparatus 100 may include an image receiving substrate web source 104 in the form of a roll mounted in a manner that a substrate web 106 may be unwound from the image receiving substrate web source. In other words, the image receiving material substrate web source 104 may provide a mechanism by which the substrate web 106 may be unwound and the substrate web may be fed to and through the image forming device 102 in direction B.

In the image forming device 102, marking materials may be deposited on the substrate web 106 and integrally or separately UV-Cured on the substrate web if desired, with at least the deposition step undertaken by a material deposition device 108 in the image forming device, and under the control of an internally-mounted, externally mounted, or otherwise associated controller 110. The substrate web 106 exiting the material deposition device 108 in direction C may now represent the printed substrate web 24 with marking material images formed on the printed image portions 26 thereon. The printed substrate web 24 may then be expelled to the blanking die apparatus 10, which may blank individual sheets 42 from the printed substrate web 24 and stack the blanked sheets onto the sheet receiving cart 60.

Figure 8:
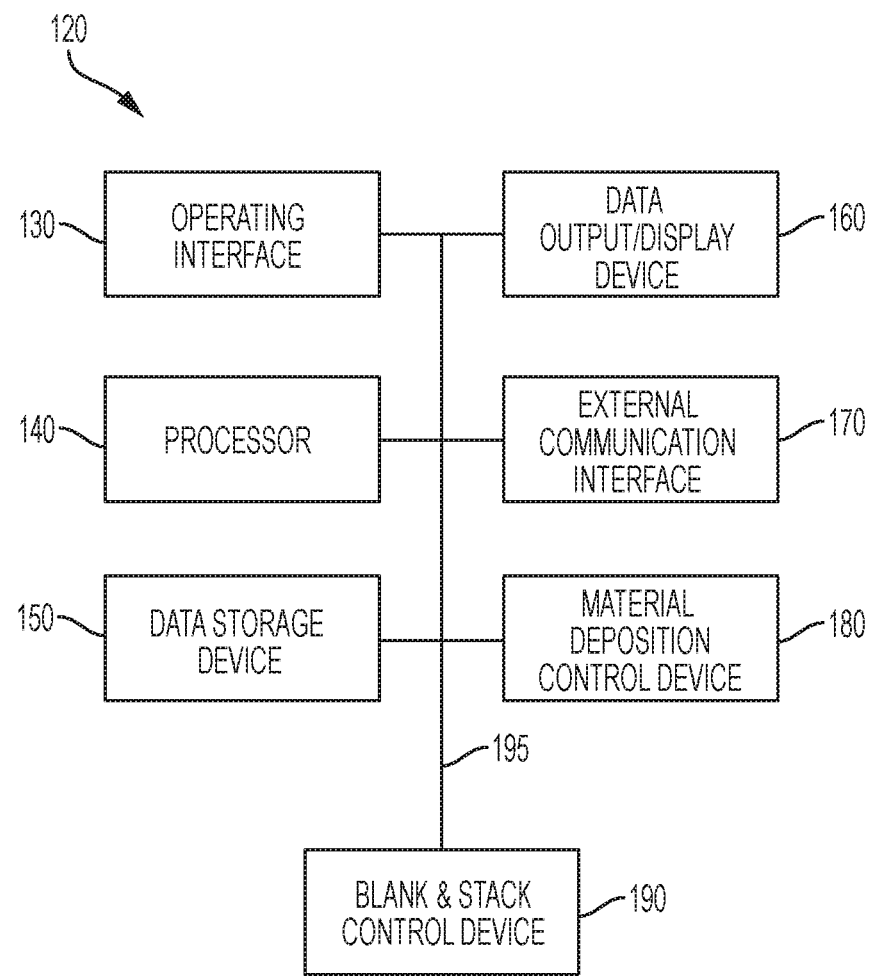
FIG. 8 illustrates a block diagram of an exemplary control system for implementing a printed substrate sheet stacking scheme according to this disclosure.

FIG. 8 illustrates a block diagram of an exemplary control system 120 for implementing a printed substrate sheet stacking scheme in an exemplary image forming apparatus 100 (see FIG. 7 and/or an exemplary blanking die apparatus 10 (see FIG. 1) according to this disclosure. The exemplary control system 120 may include an operating interface 130 by which a user may communicate with the exemplary control system. The operating interface 130 may be a locally-accessible user interface associated with the exemplary image forming device 102 (FIG. 7) and/or the exemplary blanking die apparatus. The operating interface 130 may be configured as one or more conventional mechanisms common to control devices and/or computing devices that may permit a user to input information to the exemplary control system 120 and/or to a controller 110 (FIG. 7) with which the exemplary control system is associated. The operating interface 130 may include, for example, a conventional keyboard, a touchscreen with "soft" buttons or with various components for use with a compatible stylus, a microphone by which a user may provide oral commands to the exemplary control system 120 to be "translated" by a voice recognition program, or other like device by which a user may communicate specific operating instructions to the exemplary control system. The operating interface 410 may be a part of a function of a graphical user interface (GUI) mounted on, integral to, or associated with, the image forming device and the blanking die apparatus with which the exemplary control system 120 is associated.

The exemplary control system 120 may include one or more local processors 140 for individually operating the exemplary control system 120 and for carrying into effect control and operating functions for image forming, substrate sheet blanking and/or substrate sheet stacking in the image forming device and blanking die apparatus with which the exemplary control system 120 may be associated. Processor(s) 420 may include at least one conventional processor or microprocessor that interprets and executes instructions to direct specific functioning of the exemplary control system 120, and control of the image forming process or the thermoforming process with the exemplary control system.

The exemplary control system 120 may include one or more data storage devices 150. Such data storage device(s) 430 may be used to store data or operating programs to be used by the exemplary control system 120, and specifically the processor(s) 420. Data storage device(s) 430 may be used to store information regarding, for example, particular substrate, marking material and object dimensions according to the disclosed schemes. The data storage device(s) 430 may include a random access memory (RAM) or another type of dynamic storage device that is capable of storing updatable database information, and for separately storing instructions for execution of system operations by, for example, processor(s) 420. Data storage device(s) 430 may also include a read-only memory (ROM), which may include a conventional ROM device or another type of static storage device that stores static information and instructions for processor(s) 420. Further, the data storage device(s) 430 may be integral to the exemplary control system 120, or may be provided external to, and in wired or wireless communication with, the exemplary control system 120, including as cloud-based storage components.

The exemplary control system 120 may include at least one data output/display device 160, which may be configured as one or more conventional mechanisms that output information to a user, including, but not limited to, a display screen on a GUI of the image forming device 102 and/or blanking die apparatus 10 with which the exemplary control system 120 may be associated. The data output/display device 160 may be used to indicate to a user a status of an image forming and/or object forming operation respectively of an image forming device or a blanking die apparatus with which the exemplary control system 120 may be associated including an operation of one or more of an interleaving material insertion/recovery component.

The exemplary control system 120 may include one or more separate external communication interfaces 170 by which the exemplary control system 120 may communicate with components external to the exemplary control system 120. At least one of the external communication interfaces 170 may be configured as an output port to support connection to, and/or communication with, for example, an image forming device and/or a planking die apparatus with which the exemplary control system 120 may be associated. Any suitable data connection to provide wired or wireless communication between the exemplary control system 120 and external and/or associated components is contemplated to be encompassed by the depicted external communication interface 170.

The exemplary control system 120 may include a marking material deposition control device 180 usable to control a material deposition device for depositing marketing materials, and for curing the marketing materials if desired, on a substantially continuous substrate web that may be presented at an input of the material deposition device in a form of a roll of such substrate web. The substrate web may be fed through the image forming device to have marking material images formed thereon under the control of the material deposition control device 180. The substrate web may exit the material deposition device as the printed substrate web 24 and be blanked and automatically stacked at an output side of the image forming device in order to constitute a stack of blanked substrate sheets 42 for forming an object.

The exemplary control system 120 may include a blank and stack control device 190. In instances in which the printed substrate web 24 is to be used in a printed substrate sheet stacking process, the same exemplary control system 120, through the blank and stack control device 190, may be usable to control the stack forming process. In such instances, the blank and stack control device 190 may be usable to blank printed substrate sheets from the printed substrate web as it is fed to the blanking die apparatus and to separately stack the printed substrate sheets in precise alignment for later use. The blank and stack control device 190 may control a rate at which the printed substrate web is fed to the blanking die apparatus for severing substrate sheets therefrom, including temporarily halting the feed for removal of a stack of printed substrate from the sheet receiving cart. Downtime may be minimized by using interchangeable carts 60 with locating features, as well understood by a skilled artisan. Bonding the stack to form an object may be provided subsequently off line to not slow down the printing process. The blank and stack control device 190 may operate as a part or a function of the processor 140 coupled to, for example, one or more data storage devices 150, or as one or more separate stand-alone component modules or circuits in the exemplary control system 120.

All of the various components of the exemplary control system 120, as depicted in FIG. 8, may be connected internally, and to one or more of an image forming device or a blanking die apparatus by one or more data/control busses 195. These data/control busses 195 may provide wired or wireless communication between the various components of the exemplary control system 120, whether all of those components are housed integrally in, or are otherwise external and connected to a the one or more of the image forming device or the thermoforming device with which the exemplary control system 120 may be associated.

It should be appreciated that, although depicted in FIG. 8 as an integral unit, the various disclosed elements of the exemplary control system 120 may be arranged in any combination of sub-systems as individual components or combinations of components, integral to a single unit, or external to, and in wired or wireless communication with the single unit of the exemplary control system 120. In other words, no specific configuration as an integral unit or as a support unit is to be implied by the depiction in FIG. 8. Further, although depicted as individual units for ease of understanding of the details provided in this disclosure regarding the exemplary control system 120, it should be understood that the described functions of any of the individually-depicted components may be undertaken, for example, by one or more processors 140 connected to, and in communication with, one or more data storage device(s) 150.

Figure 9:
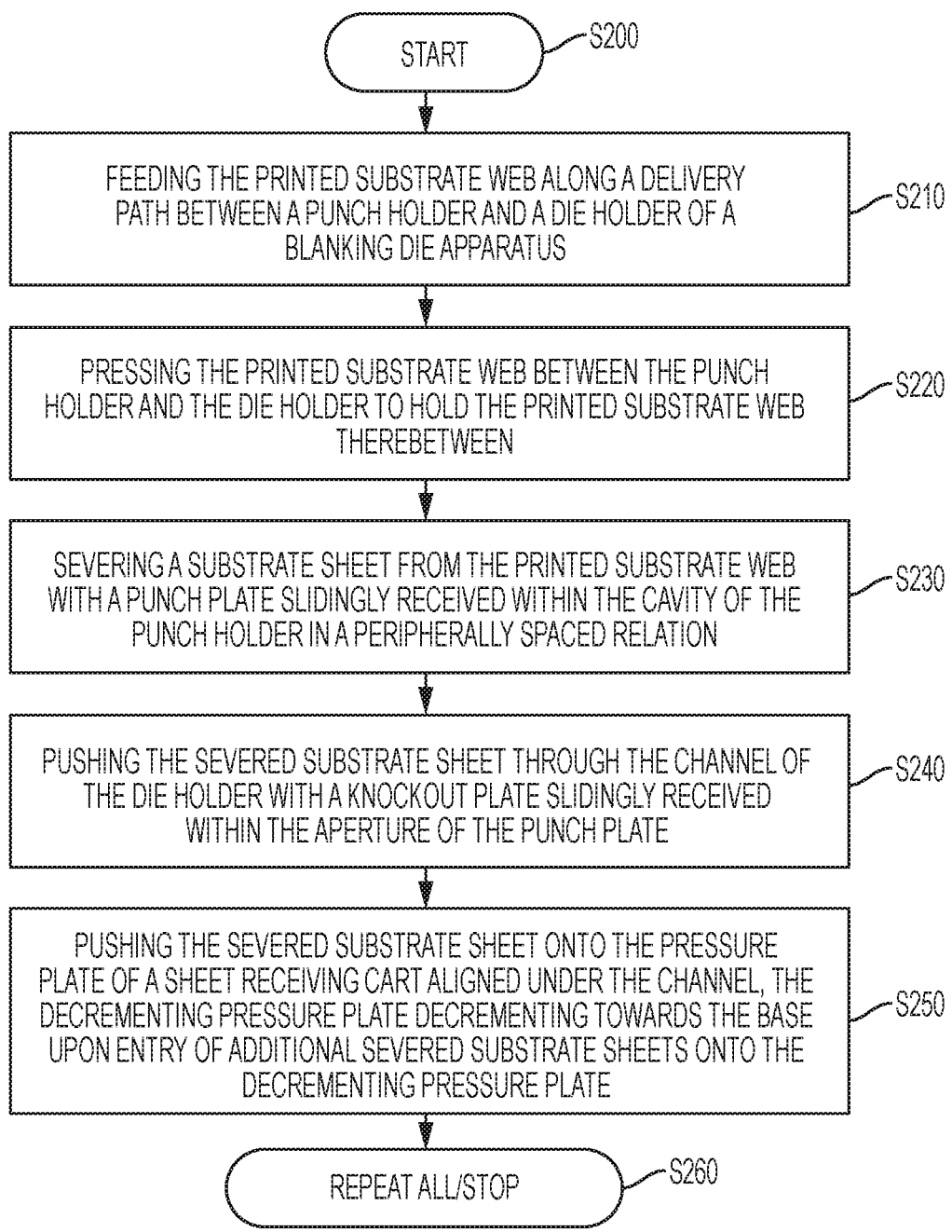
FIG. 9 is a flowchart depicting the operation of an exemplary blanking die apparatus configured for use in an image forming apparatus in accordance with an example of the embodiments.

The disclosed embodiments may include an exemplary method for stacking substrate sheets from a printed substrate web. FIG. 9 illustrates a flowchart of such an exemplary method. As shown in FIG. 9, operation of the method commences at Step S200 and proceeds to Step S210.

At Step S210, the printed substrate web is fed along a delivery path between a punch holder and a die holder of a blanking die apparatus, as can be seen by example in FIG. 1. The printed substrate web may include a printed image portion and a non-printed boarder portion. The blanking die apparatus includes at least one guide posts configured to maintain operative alignment of the punch holder and the die holder. Operation of the method proceeds to Step S220, where the printed substrate web is pressed between the punch holder and the die holder to hold the printed substrate web therebetween, as can be seen by example in FIG. 3. The punch holder is designed to reciprocate towards and away from the die holder in a direction transverse to a delivery path for the printed substrate web fed between the punch holder and the die holder. As noted above, the punch holder includes a cavity therein with a cavity opening adjacent the die holder. The die holder includes a channel there through corresponding with the cavity of the punch holder. Operation of the method proceeds to Step S230.

At Step S230, substrate sheet is blanked or severed from the printed substrate web with a punch plate slidingly received within the cavity of the punch holder in a peripherally spaced relation with the punch holder, as can be seen by example in FIG. 4. As discussed above, the punch plate is designed to reciprocate in the direction transverse to the delivery path of the printed substrate web between a recessed position in the punch holder and a cutting position extended into the channel of the die holder to sever the substrate sheet from the printed substrate web.

Operation of the method may proceed to Step S240, where the severed substrate sheet is pushed through the channel of the die holder with a knockout plate slidingly received within the aperture of the punch plate in a peripherally spaced relation with the punch plate, as can be seen by example in FIG. 5. As discussed above, the knockout plate is designed to reciprocate in the direction transverse to the delivery path of the printed substrate web between a recessed location in the punch plate and a push through position beyond the die holder to push the severed substrate sheet through the channel. In examples, the recessed location of the knockout plate coincides with the recessed position of the punch holder and the push through position of the knockout plate extends through the channel beyond the cutting position of the punch plate.

Operation of the method may proceed to Steps S250, where the knockout plate pushes the severed substrate sheet onto a sheet receiving cart aligned under the channel. As discussed above, the cart may include a base, a decrementing pressure plate and a plurality of location pins attached to the base and extending through the decrementing pressure plate towards the cavity of the punch holder to maintain operative alignment of the decrementing pressure plate and the base. The knockout plate is further configured to push the severed substrate sheet onto the decrementing pressure plate with the location pins through alignment apertures of the substrate sheet. The decrementing pressure plate may retract towards the base of the cart upon the stacking of additional severed substrate sheets onto the plate. Operation may cease at Step S260, or may continue by repeating back to Step S210 to automatically assemble an oriented stack of the severed substrates on the cart.

The exemplary depicted sequence of executable method steps represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 9, and the accompanying description, except where any particular method step is reasonably considered to be a necessary precondition to execution of any other method step. Individual method steps may be carried out in sequence or in parallel in simultaneous or near simultaneous timing. Additionally, not all of the depicted and described method steps need to be included in any particular scheme according to disclosure.

Those skilled in the art will appreciate that other embodiments of the disclosed subject matter may be practiced with many types of image forming elements common to 3D inking system in many different configurations. For example, although single-pass marking material deposition is shown in the discussed embodiments, the examples may apply to multi-pass systems and methods, including 3D object forming systems and methods. Also, while single-side printing is shown in the discussed embodiments, the examples may apply to multi-sided printing. It should be understood that these are non-limiting examples of the variations that may be undertaken according to the disclosed schemes. In other words, no particular limiting configuration is to be implied from the above description and the accompanying drawings.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A blanking die apparatus for stacking substrate sheets from a printed substrate web of a printing process, comprising:

a punch holder aligned with a die holder, the punch holder configured to reciprocate towards and away from the die holder in a direction transverse to a delivery path of the printed substrate web fed between the punch holder and the die holder, the punch holder having a cavity therein with a cavity opening adjacent the die holder, the die holder having a channel there through corresponding with the cavity of the punch holder, the punch holder and the die holder configured to receive the printed substrate web there between, the printed substrate web including a printed image portion and a non-printed boarder portion, the die holder having a top surface proximate the punch holder and defining the delivery path of the printed substrate web to slide on, the punch holder and die holder configured to press the printed substrate web from opposite directions without piercing the substrate web;

at least one guide post configured to maintain operative alignment of the punch holder and the die holder;

a punch plate slidingly shiftable within the cavity of the punch holder, the punch plate configured to reciprocate in the direction transverse to the delivery path of the printed substrate web between a recessed position in the punch holder and a cutting position extended into the channel of the die holder to sever a substrate sheet from the printed substrate web and then move the severed substrate sheet into the channel, the punch plate having an inner periphery wall defining an aperture; and a knockout plate slidingly received within the aperture of the punch plate, the knockout plate configured to reciprocate in the direction transverse to the delivery path of the printed substrate web between a recessed location in the punch plate and a push through position beyond the die holder to push the severed substrate sheet through the channel, wherein the recessed location of the knockout plate coincides with the recessed position of the punch plate and the push through position of the knockout plate extends through the channel beyond the cutting position of the punch plate.

2. The apparatus of claim 1, further comprising a sheet receiving cart aligned under the channel, the cart including a base, a decrementing pressure plate and a plurality of location pins attached to the base and extending through the decrementing pressure plate towards the cavity of the punch holder to maintain operative alignment of the decrementing pressure plate and the base.

3. The apparatus of claim 2, wherein the severed substrate sheet includes alignment apertures corresponding with the location pins, and the knockout plate is further configured to push the severed substrate sheet onto the decrementing pressure plate with the location pins through the alignment apertures.

4. The apparatus of claim 3, wherein the alignment apertures are pre-punched prior to a severing of the substrate sheet by the punch plate.

5. The apparatus of claim 2, wherein the punch plate is further configured to repeatedly reciprocate between the recessed position and the cutting position to sever additional substrate sheets from the printed substrate web fed between the punch holder and the die holder, with the knockout plate further configured to push each additional severed substrate sheet through the channel onto the decrementing pressure plate, the decrementing pressure plate configured to permit entry and containment of the severed substrate sheets to create an orientated stacked arrangement.

6. The apparatus of claim 5, the knockout plate further configured to push each additional severed substrate sheet the same distance through the channel onto the decrementing pressure plate, the decrementing pressure plate being biased from the base and configured to decrement in distance from the base upon entry of each additional severed substrate sheet onto the decrementing pressure plate.

7. The apparatus of claim 1, the knockout plate having a boundary wall that abuts only the non-printed boarder portion of the severed substrate sheet to push the severed substrate sheet through the channel.

8. The apparatus of claim 1, wherein the at least one guide post is fixedly attached to the die holder.

9. The apparatus of claim 1, wherein the printed substrate web is one of a paper, plastic, carbon reinforced material and fabric.

10. A method of automatically stacking substrate sheets from a printed substrate web of a printing process, comprising:
  a) feeding the printed substrate web along a delivery path between a punch holder and a die holder of a blanking die apparatus, wherein the punch holder is aligned with the die holder, the printed substrate web including a printed image portion and a non-printed boarder portion, the blanking die apparatus having at least one guide posts configured to maintain operative alignment of the punch holder and the die holder, the die holder having a top surface proximate the punch holder and defining the deliver path of the printed substrate web to slide on during the feeding;
  b) pressing the printed substrate web between the punch holder and the die holder to hold the printed substrate web therebetween, the punch holder configured to reciprocate towards and away from the die holder in a direction transverse to a delivery path for the printed substrate web fed between the punch holder and the die holder, the punch holder having a cavity therein with a cavity opening adjacent the die holder, the die holder having a channel there through corresponding with the cavity of the punch holder;
  c) shifting a punch plate within the cavity of the punch holder to sever a substrate sheet from the printed substrate web with the punch plate, the punch plate configured to reciprocate in the direction transverse to the delivery path of the printed substrate web between a recessed position in the punch holder and a cutting position extended into the channel of the die holder to sever the substrate sheet from the printed substrate web and then move the severed substrate sheet into the channel, the punch plate having an inner periphery wall defining an aperture; and
  d) pushing the severed substrate sheet through the channel of the die holder with a knockout plate slidingly received within the aperture of the punch plate, the knockout plate configured to reciprocate in the direction transverse to the delivery path of the printed substrate web between a recessed location in the punch plate and a push through position beyond the die holder to push the severed substrate sheet through the channel, wherein the recessed location of the knockout plate coincides with the recessed position of the punch holder and the push through position of the knockout plate extends through the channel beyond the cutting position of the punch plate.

11. The method of claim 10, further comprising, after Step d), pushing the severed substrate sheet onto a sheet receiving cart aligned under the channel, the cart including a base, a decrementing pressure plate and a plurality of location pins attached to the base and extending through the decrementing pressure plate towards the cavity of the punch holder to maintain operative alignment of the decrementing pressure plate and the base, wherein the severed substrate sheet includes alignment apertures corresponding with the location pins, and the knockout plate is further configured to push the severed substrate sheet onto the decrementing pressure plate with the location pins through the alignment apertures.

12. The method of claim 11, further comprising, before Step d), automatically pre-punching the alignment apertures with a piercing tool.

13. The method of claim 11, further comprising creating an oriented stacked arrangement of severed substrate sheets, the creating step including returning the punch plate to the recessed position in the punch holder, and repeating Steps a) through d) by repeatedly reciprocating the punch plate between the recessed position and the cutting position, feeding the printed substrate web along the delivery path between the punch holder and the die holder when the punch plate is in the recessed position, pressing the printed substrate web by holding the printed substrate web between the punch holder and the die holder, severing additional substrate sheets from the printed substrate web with the punch plate, and pushing each additional severed substrate sheet through the channel of the die holder onto the decrementing pressure plate with the knockout plate, the decrementing pressure plate configured to permit entry and containment of the severed substrate sheets to create the orientated stacked arrangement.

14. The method of claim 13, the step of pushing each additional severed substrate sheet through the channel including pushing each additional severed substrate sheet the same distance through the channel onto the decrementing pressure plate, the decrementing pressure plate being biased from the base and configured to decrement in distance from the base upon entry of each additional severed substrate sheet onto the decrementing pressure plate.

15. The method of claim 13, the severed substrate sheets having a print image thereon, the method further comprising bonding adjacent sheets of the severed substrate sheets with print images.

16. An image forming apparatus for stacking printed substrate sheets from a substrate web of a printing process, comprising:
- a printer in communication with the substrate web to transfer an image of marking material to the substrate web moving in a printing process direction;
- a punch holder aligned with a die holder, the punch holder configured to reciprocate towards and away from the die holder in a direction transverse to a delivery path of the imaged substrate web fed between the punch holder and the die holder, the punch holder having a cavity therein with a cavity opening adjacent the die holder, the die holder having a channel there through corresponding with the cavity of the punch holder, the punch holder and the die holder configured to receive the imaged substrate web there between, the imaged substrate web including a printed image portion including the deposited marking material image and a non-printed boarder portion, the die holder having a top surface proximate the punch holder and defining the delivery path of the printed substrate web to slide on the punch holder and die holder configured to press the printed substrate web from opposite directions without piercing the substrate web;
- at least one guide posts configured to maintain operative alignment of the punch holder and the die holder;
- a punch plate slidingly shiftable within the cavity of the punch holder, the punch plate configured to reciprocate in the direction transverse to the delivery path of the imaged substrate web between a recessed position in the punch holder and a cutting position extended into the channel of the die holder to sever a printed substrate sheet from the imaged substrate web and then move the severed substrate sheet into the channel, the punch plate having an inner periphery wall defining an aperture;
- a knockout plate slidingly received within the aperture of the punch plate, the knockout plate configured to reciprocate in the direction transverse to the delivery path of the imaged substrate web between a recessed location in the punch plate and a push through position beyond the die holder to push the severed printed substrate sheet through the channel, wherein the recessed location of the knockout plate coincides with the recessed position of the punch holder and the push through position of the knockout plate extends through the channel beyond the cutting position of the punch plate.

17. The apparatus of claim 16, further comprising a sheet receiving cart aligned under the channel, the cart including a base, a decrementing pressure plate and a plurality of location pins attached to the base and extending through the decrementing pressure plate towards the cavity of the punch holder to maintain operative alignment of the decrementing pressure plate and the base, wherein the severed substrate sheet includes alignment apertures corresponding with the location pins, and the knockout plate is further configured to push the severed substrate sheet onto the decrementing pressure plate with the location pins through the alignment apertures.

18. The apparatus of claim 16, further comprising a sheet receiving cart aligned under the channel, the cart including a base, a decrementing pressure plate and a plurality of location pins attached to the base and extending through the decrementing pressure plate towards the cavity of the punch holder to maintain operative alignment of the decrementing pressure plate and the base, wherein the punch plate is further configured to repeatedly reciprocate between the recessed position and the cutting position to sever additional substrate sheets from the substrate web fed between the punch holder and the die holder, with the knockout plate further configured to push each additional severed substrate sheet through the channel onto the decrementing pressure plate, the decrementing pressure plate configured to permit entry and containment of the severed substrate sheets to create an orientated stacked arrangement.

19. The apparatus of claim 18, the knockout plate further configured to push each additional severed substrate sheet the same distance through the channel onto the decrementing pressure plate, the decrementing pressure plate being biased from the base and configured to decrement in distance from the base upon entry of each additional severed substrate sheet onto the decrementing pressure plate.

20. The apparatus of claim 16, the knockout plate having a boundary wall that abuts only the non-printed boarder portion of the severed substrate to push the severed substrate sheet through the channel.

* * * * *